March 18, 1969 O. A. KERSHNER 3,433,334
DISC BRAKE AND LINING DISC ASSEMBLY
Filed June 14, 1967 Sheet 1 of 2

Inventor
Osborn A. Kershner
By: Olson, Trexler
Wolters & Bushnell attys.

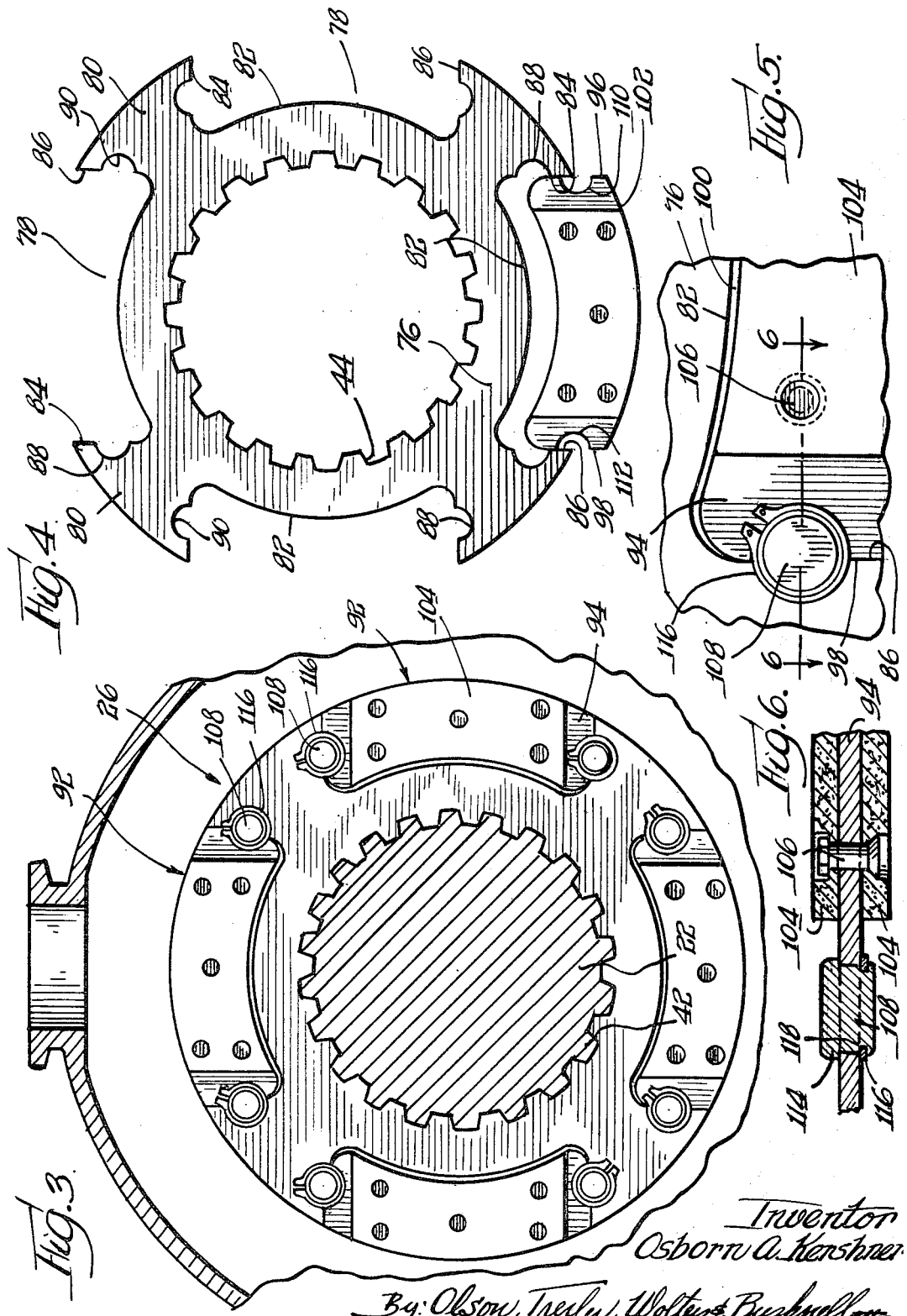

United States Patent Office 3,433,334
Patented Mar. 18, 1969

3,433,334
DISC BRAKE AND LINING DISC ASSEMBLY
Osborn A. Kershner, St. Joseph, Mich., assignor, by mesne assignments, to Lambert Brake Corporation, St. Joseph, Mich., a corporation of Michigan
Filed June 14, 1967, Ser. No. 646,027
U.S. Cl. 188—218                                3 Claims
Int. Cl. F16d 65/10, 11/00, 13/60

ABSTRACT OF THE DISCLOSURE

There is disclosed a disc brake having an annular friction disc with lining units or segments releasably retained in peripheral notches in an annular body of the disc for facilitating removal and replacement.

---

The present invention relates to a novel disc brake structure, and more specifically to a novel friction disc assembly for such a structure.

Disc brake structures heretofore in general use have frequently included one or more annular discs which are subject to wear and periodically need replacement. Many such discs have been provided with facings of lining material which ultimately become worn so as to require replacement. These disc brake structures have been installed in tractors, heavy road building equipment and other machines. The placement of the disc brake in such machines has frequently been in association with a through shaft forming a part of the transmission or drive mechanism so that the brake is relatively inaccessible and removal of the brake discs for replacement or repair is difficult time-consuming and expensive.

It is an important object of the present invention to provide a novel disc brake structure and more specifically a novel friction disc for such a structure whereby wear elements or linings may be removed and replaced without necessitating removal of the discs in their entirety or disassembling of basic components of the machine in which the disc structure is installed.

A more specific object of the present invention is to provide a novel disc structure for a disc brake which is constructed so that wear elements or linings thereof may be removed and replaced from the periphery of the brake.

A still further specific object of the present invention is to provide a novel annular friction disc assembly for a disc brake which includes wear elements or lining units releasably connected with an annular disc body in a manner which facilitates easy removal and replacement of the wear elements or lining segments from the periphery of a brake assembly.

Other objects and advantages of the present invention will become apparent from the following description and the accompanying drawings wherein:

FIG. 3 is a fragmentary sectional view taken generally along line 3—3 in FIG. 2;

FIG. 4 is an elevational view showing a friction disc structure incorporating features of the present invention in a partially assembled condition;

FIG. 5 is an enlarged fragmentary elevational view showing a portion of the friction disc structure in greater detail; and FIG. 6 is a fragmentary partial sectional view taken along line 6—6 in FIG. 5.

Figure 2:
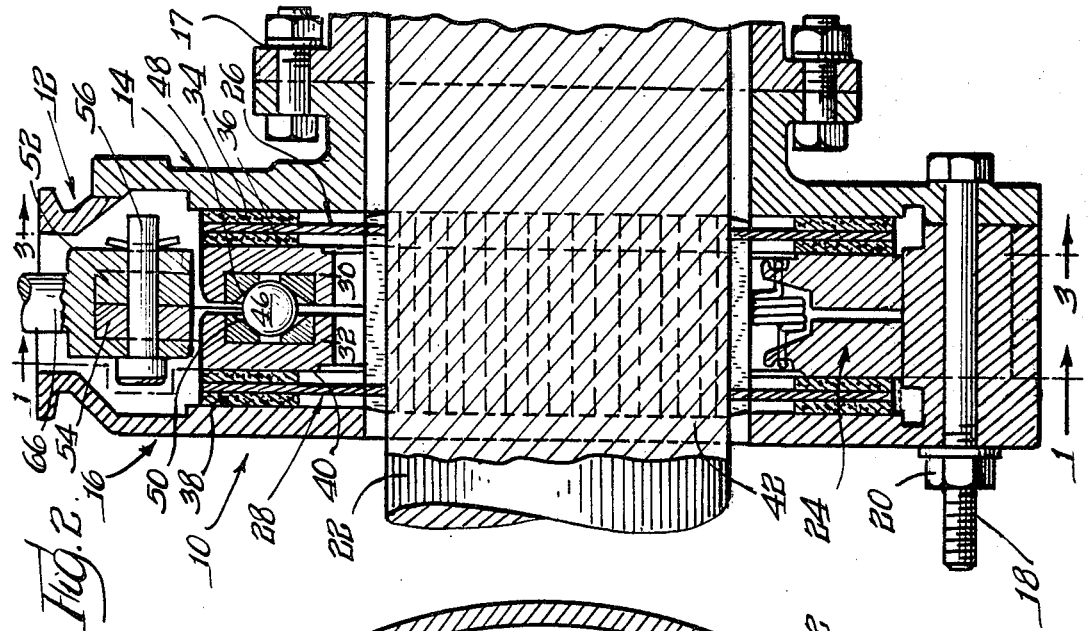
FIG. 2 is a partial sectional view taken generally along line 2—2 in FIG. 1.
Figure 1:
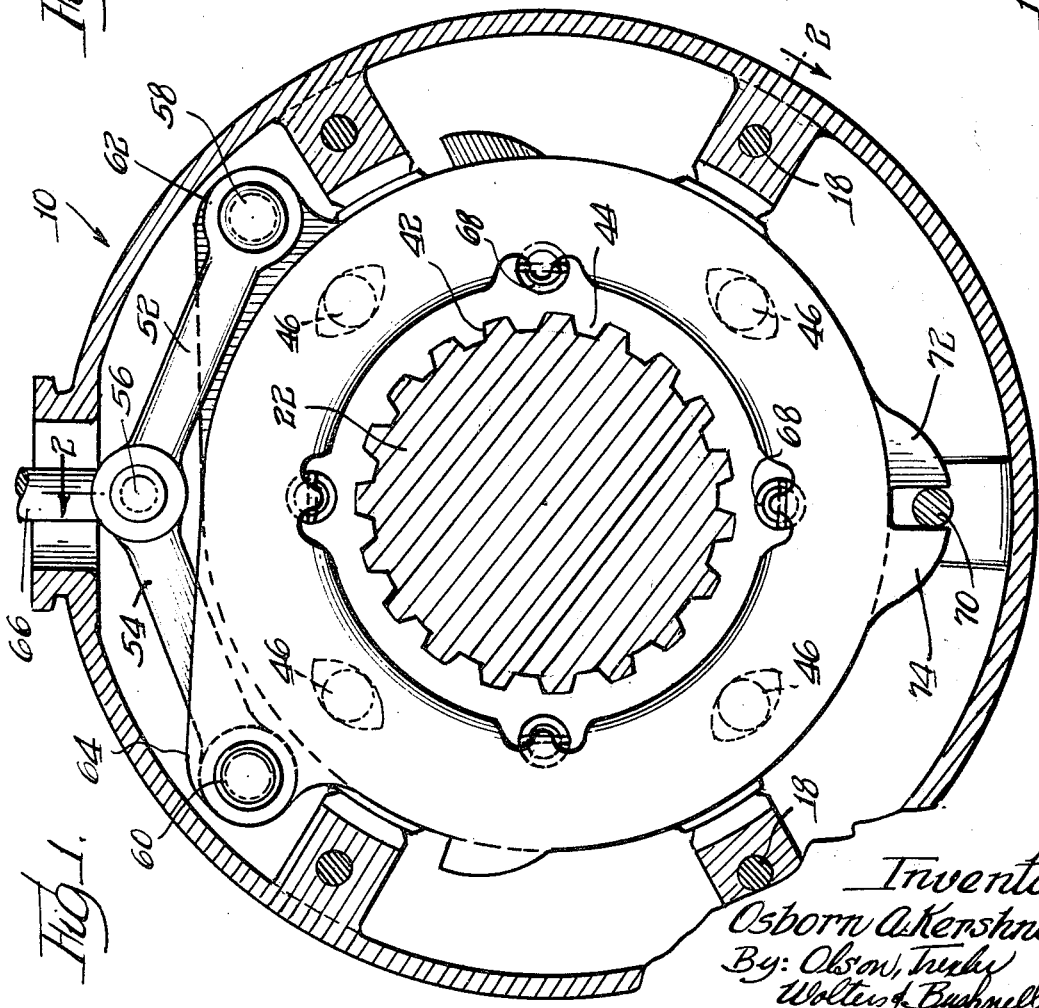
FIG. 1 is a fragmentary sectional view, partially broken away and taken generally along line 1—1 in FIG. 2.

Referring now more specifically to the drawings wherein like parts are designated by the same numerals throughout the various figures, a brake assembly 10 incorporating features of the present invention is shown in FIGS. 1 and 2. The assembly includes housing means 12 having complementary opposite end portions 14 and 16. The portion 14 may be bolted or otherwise fixed to a part 17 of the vehicle or machine in which the brake is installed and the housing portion 16 is releasably secured to the housing portion 14 by a plurality of bolts 18 and cooperating nuts 20. Upon loosening of the nuts 20, the housing portion 16 may be separated from the housing portion 14 to provide a peripheral space therebetween for facilitating servicing of the brake unit in the manner described below.

The brake assembly surrounds a rotatable shaft 22 of the vehicle or machine. A disc assembly 24 is disposed within the housing and is operatively connected between the housing and the shaft for controlling rotary movement of the shaft. In the embodiment shown, the disc assembly comprises friction disc structures 26 and 28 constructed in accordance with features of the present invention as described more in detail below, and actuating discs 30 and 32. The friction disc structure 26 is adapted to be clamped between friction surfaces 34 and 36 of the housing portion 14 and actuaitng disc 30 respectively. The friction disc structure 28 is similarly adapted to be clamped between friction surfaces 38 and 40 of the housing portion 16 and actuating disc 32 respectively.

The actuating discs 30 and 32 may be operated by various known means to accomplish the aforementioned clamping action which causes stopping of the shaft 22 since the friction discs 26 and 28 are mechanically interconnected with the shaft. In the embodiment shown, the shaft 22 is formed with splines 42 interengageable with complementtary splines 44 on the inner peripheries of the friction discs. Furthermore, in the embodiment shown, the means for operating the actuating discs comprises balls or bearing elements 46 disposed between opposed and oppositely inclined cam surfaces 48 and 50 on the actuating discs so that upon relative rotation of the actuating discs the balls ride up on the cam surfaces and spread or relatively axially shift the actuating discs for clamping the friction discs against the end plates or housing members.

Suitable means are provided for relatively rotating the actuating discs and thereby energizing the brake assembly. In the embodiment shown, this means includes links 52 and 54 respectively having first ends pivotally connected to a common pin 56 and opposite ends pivotally connected by pins 58 and 60 to ears 62 and 64 projecting from the peripheries of the actuating discs 30 and 32. The pin 56 is in turn connected with a link 66 which is adapted to be pulled radially outwardly manually or by any suitable linkage or other means so as to rotate the actuating discs relative to each other and energize the brake.

While the links described above are adapted to be pulled for actuating the discs in one direction, springs 68 are connected between the actuating discs for retaining them toward their deenergized position. An abutment or torque pin 70 is fixed between the opposite end portions of the housing for engagement with ears or stops 72 and 74 on the discs 30 and 32 respectively and thereby limiting rotation of each of these discs in one direction so as to transfer the torque from the discs to the housing during a braking operation.

The friction disc structures 26 and 28 are identically constructed and therefore only the disc 26 which is shown best in FIGS. 3–6 will be described in detail. The disc structure 26 comprises an annular body 76 formed from a suitable material such as steel and having the aforementioned splines 44 formed around the inner margin thereof. While in the embodiment disclosed herein, the disc structure 26 is shown as adapted by the splines for connection with a central shaft, it is to be understood that features of the present invention may be incorporated in disc structures which are provided with means at their outer peripheries rather than their inner margins for connection with an adjacent part of the assembly.

The disc body 76 is formed with peripheral notch means comprising annularly spaced notches 78 separated by generally radially extending finger portions 80. Bottom edges 82 of the notches are preferably segments of a circle and opposite ends of the notches are defined by edges 84 and 86 on the finger portions, which edges, in the embodiment shown, are parallel to each other and to a radius line bisecting their associated notch. Recesses 88 and 90 in the form of half circles are formed in each of the edges 84 and 86 for the purpose described below.

The disc structure 26 includes wear segments or lining assemblies 92 respectively releasably secured in the notches 78. Each of the wear segments or lining assemblies 92 comprises a body 94 preferably formed of metal the same as or similar to the metal of the disc body 76. The body 94 has a size and shape substantially corresponding to the size and shape of its associated notch 78. Specifically, the body 94 has opposite end edges 96 and 98 having a sliding and abutting fit with the end edges 84 and 86 of its associated notch. The body 94 has an inner edge 100 similar in shape to the bottom edge 82 of the notch, but a slight clearance may be provided between these edges as shown best in FIG. 5. An outer edge 102 of the body 94 is a segment of a circle and provides a continuation of the circular periphery of the main body 76.

Segments 104 of friction or brake lining material are secured to one or both sides of the body 94 by rivets 106 or any other suitable means. The segments 104 provide the friction surfaces engageable with the complementary friction surfaces of the brake housing and actuating discs.

It will be appreciated that during use, the lining segments or elements 104 will become worn. Thus, the lining assemblies 92 are releasably secured within their respective notches 78 so that they may be replaced when worn. This is accomplished by inserting short retaining pins 108 into apertures formed by the aforementioned recesses 88 and 90 in the main body 76 and complementary half circle recesses 110 and 112 formed in the body 94. As shown best in FIG. 6, each pin has an enlarged head 114 at one end thereof and is releasably retained in assembled relationship with the body members 76 and 94 by a snap ring 116 engageable in a groove 118 formed in an end portion of the pin projecting beyond an opposite side of the body members.

It will be appreciated that with the structure of the disc assembly 26 described above, the lining units or sub-assemblies 92 may be removed and replaced when worn from a position radially or peripherally of the disc. Thus, when it is desired to replace the lining segments, it is unnecessary to completely disassemble the brake from the vehicle or apparatus in which it is installed. To the contrary it is merely necessary to loosen the nuts 20 sufficiently to permit the housing portion 16 to be axially shifted away from the opposite end or housing portion 14 to provide a predetermined space therebetween sufficient to permit access to the peripheries of the friction disc assemblies. In practice it has been found that it is usually only necessary to shift the housing portion 16 so as to provide a space of about one inch between the opposite end portions of the housing. This space permits a workman or mechanic to reach into the interior of the housing, disengage the snap rings 116 retaining the pins 108, remove the pins 108 and then remove the various lining sub-assemblies 92. Then the process is reversed and the new lining assemblies are inserted whereupon the retaining pins 108 and snap rings 116 are again assembled. The operation is completed by tightening the nuts 20 so as to secure the housing portion 16 with respect to the housing portion 14.

While a preferred embodiment of the present invention has been shown and described herein, it is obvious that many structural details may be changed.

The invention is claimed as follows:

1. In a disc brake assembly, housing means comprising first and second opposite end portions, means releasably securing said end portions together for permitting the axial separation thereof when released to provide a space therebetween, a disc assembly including a friction disc mounted for rotation between said end portions, said friction disc including an annular body having a plurality of annular spaced notches therein, separated by generally radially extending finger portions, the radially inward edge of each of said notches being of a predetermined shape with opposite ends of each of the notches being defined by edges of respective ones of said finger portions, the last-mentioned edges being parallel to each other and to a radius line of said annular body bisecting an associated notch, each of said edges including a recess therein, and a friction unit releasably secured in each said notch and being removable from said notch and replaceable through said space between said end portions when the latter are axially separated, each of said friction units comprising a body having a size and shape complementary to a respective notch, including end edges being in sliding engagement with and abutting respective end edges of corresponding finger portions and an inwardly facing edge similar in shape to the radially inward edge of said notch, and recesses formed in respective end edges of said body and being aligned with respective recesses of said friction disc to form therewith respective apertures, and a plurality of pin members each being received in a respective one of said apertures formed by joining said friction units and friction disc, said pin members extending through said apertures in a direction parallel to the axis of rotation of said friction disc and each including an enlarged head at one end thereof, the transverse dimension of said head being greater than that of a respective aperture, and fastener means secured to the other ends of each of said pin members to retain the latter in corresponding apertures.

2. A disc brake assembly as claimed in claim 1, wherein said recesses formed in respective edges of said friction disc and said friction units have the shape of half-circles with predetermined radii, so that the apertures formed by joining said friction units and said friction disc are circular in cross-section with a corresponding predetermined diameter, wherein each of said pin members has a circular cross-section with a diameter dimensioned to permit the insertion of said pin members in respective apertures, said pin members each having a groove formed in the end thereof opposite said head and wherein said fastener means includes a snap-on ring member engaging said pin member in said groove to retain said pin member in a respective aperture.

3. A disc assembly comprising a rotatably mountable friction disc, including an annular body having a plurality of annular spaced notches therein separated by radially extending finger portions, the radially inward edge of each of said notches being of a predetermined shape with opposite ends of each of said notches being defined by edges of respective ones of said finger portions, the last-mentioned edges being parallel to each other and to a radius line of said annular body bisecting an associated notch, each of said edges including a recess therein of a predetermined shape, a plurality of friction units, one of said friction units secured in each of said notches and being removable therefrom, each of said friction units comprising a body having a size and shape complementary to a respective notch, including end edges being in sliding engagement with and abutting respective end edges of said finger portion, and an inwardly facing edge similar in shape to the radially inward edge of said notch, and recesses formed in respective end edges of said body and each having a shape similar to that of the recesses formed in said friction disc, said body recesses being aligned with respect to said last-mentioned recesses to form therewith corresponding apertures, a plurlaity of pin members extending through said apertures in a direction parallel to the axis of rotation of said friction disc and each including an enlarged head at one end thereof and a groove formed in the opposite end, the transverse dimension of said head being larger than the diameter of a respective one of said apertures and a plurality of snap-on ring members engaging respective ones of said pin members and received in corresponding grooves thereof to retain said pin members in respective apertures.

References Cited

UNITED STATES PATENTS 2,015,890 10/1935 Gottschalk.
2,893,519 7/1959 Martin.
3,106,990 10/1963 Kershner.
3,124,216 3/1964 Buyze.
3,239,033 3/1966 Walker.

FOREIGN PATENTS 724,904 2/1955 Great Britain.

GEORGE E. A. HALVOSA, *Primary Examiner.*